Sept. 6, 1949.  M. F. A. JULIEN  2,480,934
SUSPENSION SYSTEM FOR AUTOMOBILE VEHICLES
Filed March 5, 1945
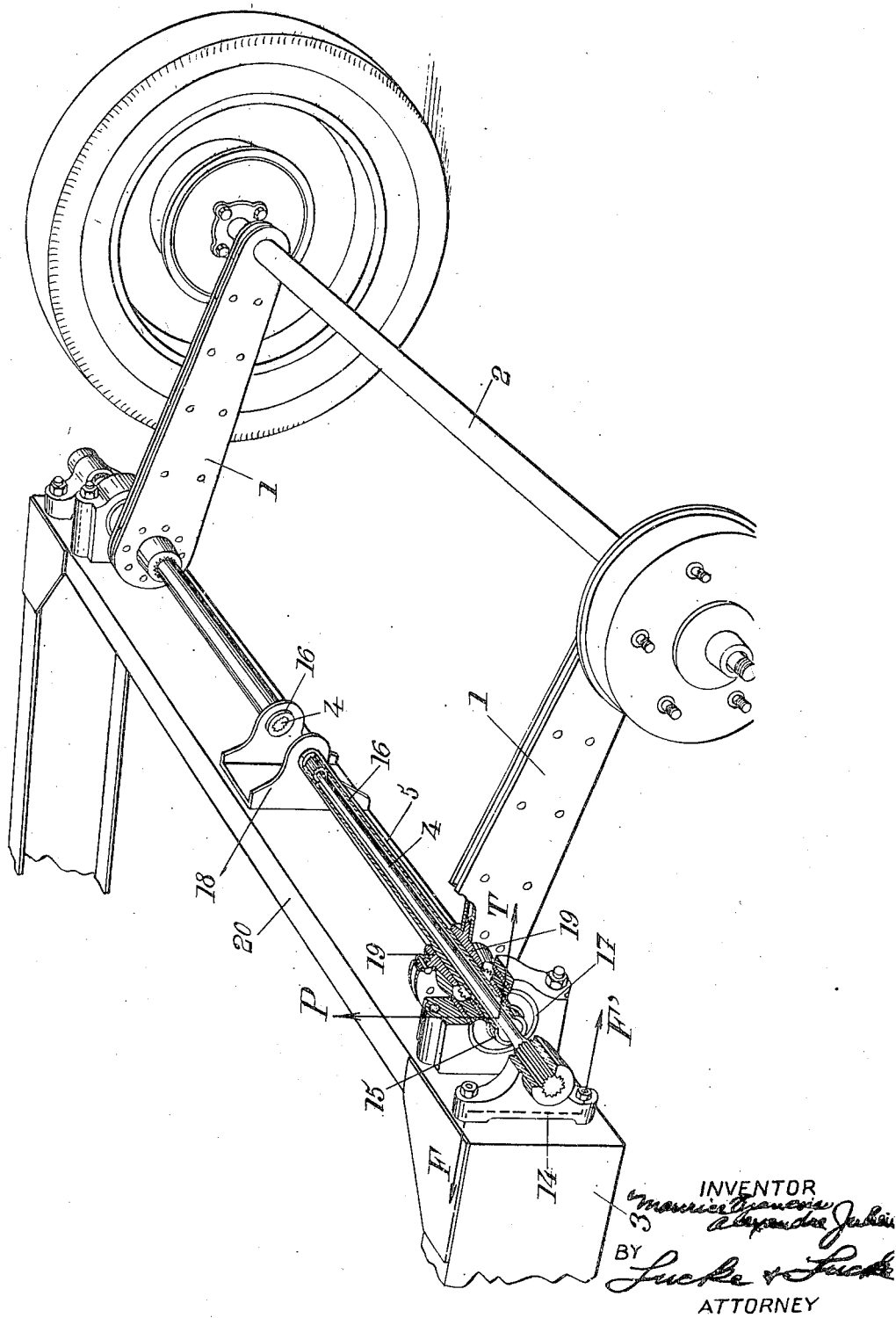

Patented Sept. 6, 1949

2,480,934

UNITED STATES PATENT OFFICE 2,480,934

SUSPENSION SYSTEM FOR AUTOMOBILE VEHICLES

Maurice François Alexandre Julien, Paris, France

Application March 5, 1945, Serial No. 581,007
In France November 22, 1944

3 Claims. (Cl. 267—57)

The present invention relates to wheeled vehicle suspension devices of the kind including torsional bars, that is to say elongated elements one end of which is twisted with respect to the other end under the effect of the suspension stresses so as to take advantage of the torsional elasticity of said elements. The invention is more especially concerned with the suspension of a pair of wheels at the front or at the rear of a chassis-frame the width of which is greater than the distance between said wheels.

The object of my invention is to provide a suspension system of this kind which is better adapted to meet the requirements of practice than existing suspension systems, and, in particular, in which the forces are better distributed, which permits of reducing the weight of the system.

A preferred embodiment of my invention will be hereinafter described with reference to the accompanying drawing, given merely by way of example, and in which:

The only figure is a perspective view, with parts cut off, of a suspension device according to the present invention.

My invention is concerned with the case of a vehicle the chassis-frame of which is of the maximum width possible for the type of vehicle that is being considered, this width being greater than the distance between the wheels, so that the outer wall of the vehicle body is for instance substantially flush with the external plane of the wings. It is for instance desired to provide a suspension device for the rear wheels by means of torsional bar devices, these wheels being either dependent on each other or independent, driven or freely rotatable.

On the drawing I have shown at 3 a chassis-frame including a rear transverse member 20. The wheels which are supposed to be connected together by an axle 2, are carried by arms 1.

Each arm 1 is fixed at right angles to one of the ends 15 of a torsional tube 5 the other end 16 of which is located near the middle longitudinal plane of the vehicle, where it is fixed to one end of a torsional bar 4, mounted on the inside of tube 5, coaxially therewith and of a length slightly smaller than one half of the width of the chassis. The other end of bar 4 is securely held in a fixation device 14, carried by the chassis-frame in the general plane of longitudinal member 3.

Furthermore, I provide, between this suspension device and the chassis-frame, means for preventing bending of tube 5 and bar 4 while permitting the rotary movements inherent in torsional deformations of the whole. These means are arranged in such manner that the reactions due in particular to the load of the vehicle and to horizontal forces acting thereon (traction, braking, etc.) transmit but small stresses, or even no stress at all, to the central portion of transverse member 20.

For instance, these means may be constituted by two bearings, 17 and 18, one of which, to wit 17, is for instance located between arm 1 and fixation device 14, while the other, to wit 18, is located in the central portion of transverse member 20. These two bearings may include any cushioning devices, either elastic or not, as shown at 19.

Whatever be the particular construction of the elements of such a structure, it is clear that:

On the one hand, if the distance between the outer bearing 17 and arm 1 is small, reactions P and T, due respectively to the load and to the horizontal forces, will be located substantially in the plane of this last mentioned bearing 17, while, on the contrary, the other bearing 18 will undergo but relatively small efforts; and, On the other hand, concerning the reactions due to the efforts that are developed in the tube and the torsional bar in consequence of the suspension action, these reactions are zero in the inner or central bearing 18 and are exclusively transmitted to the fixation device 14, in the form of a torque F, F', located in the vertical plane of longitudinal member 3, that is to say ensuring the best possible conditions for being absorbed by the chassis-frame without undue deformation of any part thereof.

Of course, this suspension device will be completed by suitable shock absorbing means.

Whatever be the particular embodiment that is chosen, I obtain a device the operation of which results sufficiently clearly from the preceding explanations for making it unnecessary further to describe it.

This suspension device has over similar devices used up to the present time, many advantages among which the following may be cited as being particularly interesting:

The construction can be made of lighter weight, owing to a better distribution of the efforts supported by the parts;

Furthermore, it is possible to improve to a large degree the elasticity of the suspension device even when the space that is available between two corresponding wheels is relatively small, because the whole width of the chassis frame of the vehicle is taken advantage of.

Finally, the suspension device permits, under remarkable conditions of rapidity, the fixation and the removal of the rear wheels with respect to the chassis frame, these operations requiring merely the tightening or withdrawal of some bolts or other equivalent fixation means on, or from, the web of the rear cross member of the chassis-frame.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In a wheeled vehicle having a chassis-frame including longitudinal side members and at least one transverse member, the distance between said side members being greater than the distance between the two wheels of the corresponding right and left pair of wheels, a suspension device comprising, in combination, a torsional bar running transversely to said side members and fixed at one end to said frame in the vertical plane of one of said side members, said torsional bar extending inwardly from said vertical plane and stopping at a short distance from the vertical longitudinal middle plane of the vehicle, a torsional tube coaxially surrounding said torsional bar, means for coupling the inner end of said torsional bar with the corresponding end of said torsional tube so that torsions are transmitted from one to the other, said tube extending from said end thereof outwardly, a wheel supporting arm fixed to the second end of said tube and extending transversely thereto, and bearing means carried by said frame for supporting said torsional tube against bending stresses.

2. In a wheeled vehicle having a chassis-frame including longitudinal side members and at least one transverse member, the distance between said side members being greater than the distance between the two wheels of the corresponding right and left pair of wheels, a suspension device comprising, in combination, a torsional bar running along said transverse member and fixed at one end thereto in the vertical plane of one of said side members, said torsional bar extending inwardly from said vertical plane and stopping at a short distance from the vertical longitudinal middle plane of the vehicle, a torsional tube coaxially surrounding said torsional bar, means for coupling the inner end of said torsional bar with the corresponding end of said torsional tube so that torsions are transmitted from one to the other, said tube extending from said end thereof outwardly, a wheel supporting arm fixed to the second end of said tube and extending transversely thereto, and two bearings carried by said transverse member for supporting said torsional tube to prevent bending thereof, one of said bearings being located close to the vertical plane of said side member and the other near said longitudinal middle plane of the vehicle.

3. In a wheeled vehicle having a chassis-frame including longitudinal side members and at least one transverse member, the distance between said side members being greater than the distance between the two wheels of the corresponding right and left pair of wheels, a suspension device comprising, in combination, a torsional bar running along said transverse member and fixed at one end thereto in the vertical plane of one of said side members, said torsional bar extending inwardly from said vertical plane and stopping at a short distance from the vertical longitudinal middle plane of the vehicle, a torsional tube coaxially surrounding said torsional bar, means for coupling the inner end of said torsional bar with the corresponding end of said torsional tube so that torsions are transmitted from one to the other, said tube extending from said end thereof outwardly, a wheel supporting arm fixed to the second end of said tube and extending transversely thereto, and two bearings carried by said transverse member for supporting said torsional tube to prevent bending thereof, one of said bearings being located between the vertical plane of said side member and the point of fixation of said wheel supporting arm to said tube and the other near said longitudinal middle plane of the vehicle.

MAURICE FRANÇOIS ALEXANDRE JULIEN.

REFERENCES CITED

The following references are of record in the file of this patent:

UNITED STATES PATENTS

| Number | Name | Date |
|---|---|---|
| 2,024,199 | Barnes et al. | Dec. 17, 1935 |
| 2,043,542 | Johnson | June 9, 1936 |
| 2,060,015 | Barnes et al. | Nov. 10, 1936 |
| 2,083,381 | Hutchison | June 8, 1937 |

FOREIGN PATENTS

| Number | Country | Date |
|---|---|---|
| 220,146 | Britain | Aug. 14, 1924 |
| 770,709 | France | July 2, 1934 |
| 800,841 | France | May 11, 1936 |